(12) United States Patent
Yoshida

(10) Patent No.: US 10,384,465 B2
(45) Date of Patent: Aug. 20, 2019

(54) CONTROL APPARATUS THAT CONTROLS PRINT EXECUTING SECTION THAT IS CAPABLE OF FORMING DOTS IN DIFFERENT SIZES

(71) Applicant: BROTHER KOGYO KABUSHIKI KAISHA, Nagoya, Aichi (JP)

(72) Inventor: Yasunari Yoshida, Aichi-ken (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/903,089

(22) Filed: Feb. 23, 2018

(65) Prior Publication Data

US 2018/0250953 A1 Sep. 6, 2018

(30) Foreign Application Priority Data

Mar. 2, 2017 (JP) .................... 2017-039748

(51) Int. Cl.
| | |
|---|---|
| B41J 2/505 | (2006.01) |
| G06F 3/12 | (2006.01) |
| G06K 15/02 | (2006.01) |
| H04N 1/405 | (2006.01) |

(52) U.S. Cl.
CPC .......... *B41J 2/5054* (2013.01); *G06F 3/1208* (2013.01); *G06F 3/1211* (2013.01); *G06F 3/1247* (2013.01); *G06F 3/1285* (2013.01); *G06K 15/1809* (2013.01); *H04N 1/405* (2013.01); *H04N 1/4057* (2013.01)

(58) Field of Classification Search
USPC ......................................... 358/1.2
See application file for complete search history.

(56) References Cited

U.S. PATENT DOCUMENTS

| | | | |
|---|---|---|---|
| 6,169,608 B1 * | 1/2001 | Yoshida | H04N 1/52 358/1.9 |
| 2013/0163010 A1 * | 6/2013 | Yoshida | B41J 19/142 358/1.8 |
| 2017/0151779 A1 * | 6/2017 | Yoshida | B41J 2/04541 |

FOREIGN PATENT DOCUMENTS

JP H10-191083 A 7/1998

* cited by examiner

*Primary Examiner* — Ngon B Nguyen
(74) *Attorney, Agent, or Firm* — Scully, Scott, Murphy & Presser, PC

(57) ABSTRACT

When a corrected pixel value of a target pixel is within a first range and the target pixel is not a prohibited pixel, a first value indicating formation of a dot of a first type having a minimum size is determined as a pixel value of a print pixel corresponding to the target pixel. When the corrected pixel value is within a second range different from the first range and the target pixel is not the prohibited pixel, a second value indicating formation of a dot of a second type having a size greater than the dot of the first type is determined as the pixel value of the print pixel. When the corrected pixel value is within the first range and the target pixel is the prohibited pixel, a non-formation value indicating formation of no dots is determined as the pixel value of the print pixel.

11 Claims, 12 Drawing Sheets

(FIRST AND SECOND EMBODIMENTS)

(MODIFICATION 4)

FIG. 7

COLUMNS →
ROWS ↓

16 columns

|  | C=0 | C=1 | C=2 | ... | C=13 | C=14 | C=15 |
|---|---|---|---|---|---|---|---|
| R = 0 | 28 | 33 | 189 | | 255 | 160 | 220 |
| R = 1 | 238 | 146 | 56 | ... | 217 | 151 | 21 |
| R = 2 | 99 | ⓪ | 36 | | ③ | 133 | 44 |
| R = 13 | 10 | 160 | 132 | | 91 | 202 | 151 |
| R = 14 | 211 | 77 | 141 | ... | 191 | 93 | ⑫ |
| R = 15 | 198 | 241 | 100 | | 76 | 48 | 137 |

MS 16 rows

C: REMAINDER OBTAINED BY DIVIDING X COORDINATE OF TARGET PIXEL BY SIXTEEN (16)

R: REMAINDER OBTAINED BY DIVIDING Y COORDINATE OF TARGET PIXEL BY SIXTEEN (16)

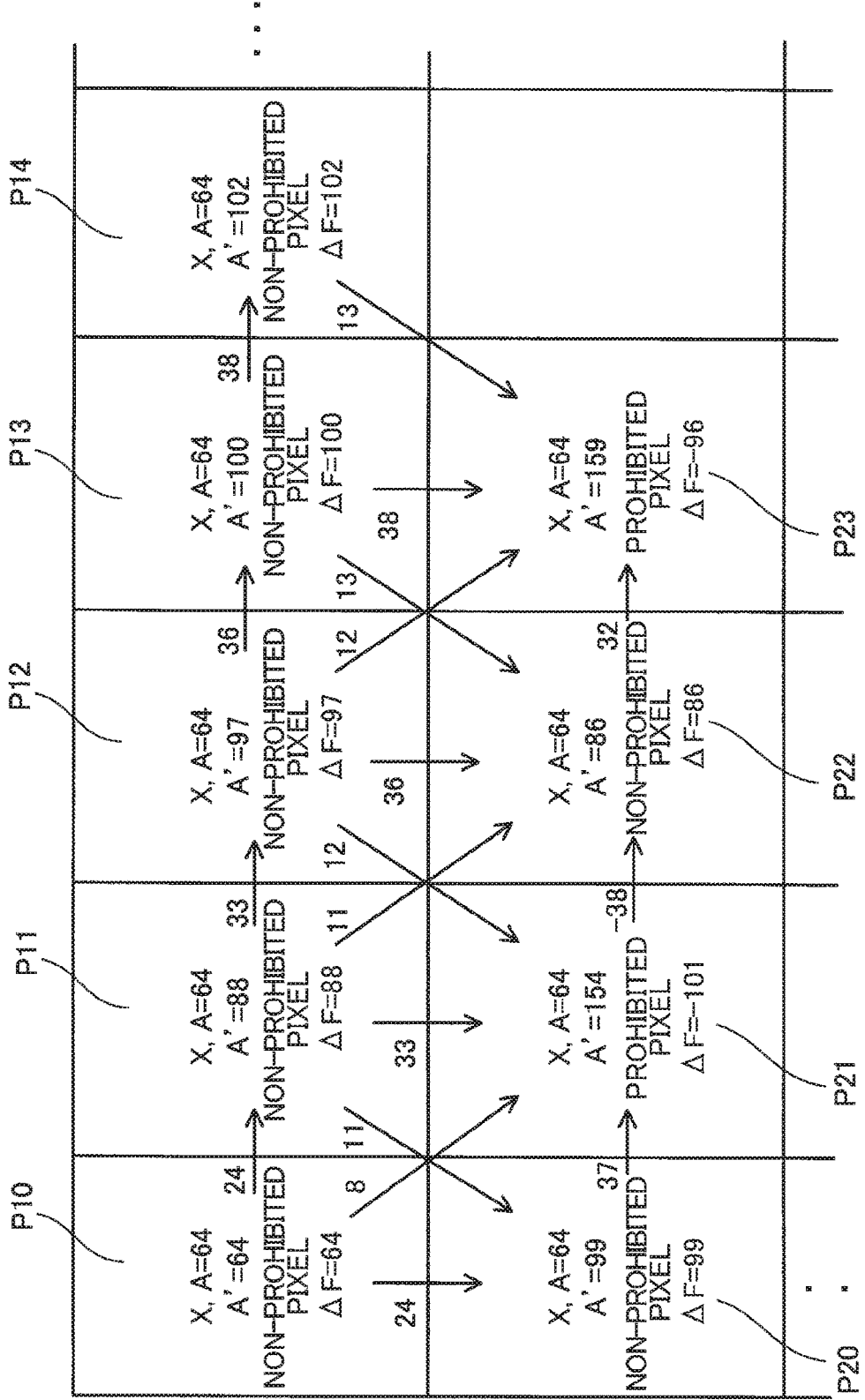

CONTROL APPARATUS THAT CONTROLS PRINT EXECUTING SECTION THAT IS CAPABLE OF FORMING DOTS IN DIFFERENT SIZES

CROSS REFERENCE TO RELATED APPLICATION

This application claims priority from Japanese Patent Application No. 2017-039748 filed Mar. 2, 2017. The entire content of the priority application is incorporated herein by reference.

TECHNICAL FIELD

The present disclosure describes a control apparatus which controls a print executing section to execute printing on a print medium, wherein the print executing section is capable of forming dots of a plurality of different types, the dots of different types being different in their sizes.

BACKGROUND

U.S. Pat. No. 6,169,608 describes a binarizing apparatus which binarizes image data into ON or OFF by using an error diffusion method, wherein ON indicates forming a dot on a print medium at a position corresponding to a pixel, and OFF indicates forming no dot at the subject position. A printer executes printing according to the binarized data.

SUMMARY

The above-described technique is, however, not related to a printer of a type that is capable of forming dots of a plurality of types that are different in their sizes.

Now assume a situation that the printer of this type executes printing on a print medium to form such an image in which a first area and a second area are adjacent to each other. In the first area, a dot in a minimum size is formed at each of all the pixel positions to express a solid image. On the other hand, in the second area, both of dots in the minimum size and dots in sizes greater than the minimum size are formed. In this case, a viewer of the printed image may recognize a border between the first area and the second area. This is because the first area has a relatively low grain recognition degree, but the second area has a relatively high grain recognition degree, wherein the grain recognition degree of each area is defined as a degree by which grains are recognized in the subject area. Consequently, the viewer may feel that the printed image has low image quality.

The present disclosure describes a technique that can improve image quality of a printed image.

According to one aspect, the disclosure provides a control apparatus for causing a print executing section to perform printing. The printing executing section is configured to form, on a print medium, M number of types of dots. M is an integer greater than or equal to two (2). The M number of types of dots include dot of a first type having a minimum size and dot of a second type having a size greater than the dot of the first type. The control apparatus includes a controller configured to perform:

acquiring target image data containing a plurality of pixels;

generating print data containing a plurality of print pixels, the print pixels corresponding to the pixels, respectively, the generating the print data determining, for each pixel, a pixel value for the corresponding print pixel; and supplying the print data to the print executing section.

The generating the print data includes:

correcting a pixel value of a target pixel among the plural pixels by using two or more pixel-value error amounts corresponding to two or more neighboring pixels existing at positions neighboring to the target pixel, thereby calculating a corrected pixel value of the target pixel;

by using the pixel value of the target pixel, judging whether or not the target pixel is a prohibited pixel, formation of a dot of at least the first type among the M number of types of dots being prohibited on the print medium at a position corresponding to the prohibited pixel;

determining the pixel value of the print pixel corresponding to the target pixel by using the corrected pixel value of the target pixel and dependently on whether the target pixel is the prohibited pixel; and calculating the pixel-value error amount corresponding to the target pixel by using the pixel value of the print pixel corresponding to the target pixel.

The determining the pixel value of the print pixel corresponding to the target pixel includes:

in a case where the corrected pixel value of the target pixel is within a first range and the target pixel is not the prohibited pixel, determining, as the pixel value of the print pixel corresponding to the target pixel, a first value indicating formation of a dot of the first type;

in a case where the corrected pixel value of the target pixel is within a second range that is different from the first range and the target pixel is not the prohibited pixel, determining, as the pixel value of the print pixel corresponding to the target pixel, a second value indicating formation of a dot of the second type;

in a case where the corrected pixel value of the target pixel is within a specific range that is different from both of the first and second ranges, determining, as the pixel value of the print pixel corresponding to the target pixel, a non-formation value indicating formation of no dots; and in a case where the corrected pixel value of the target pixel is within the first range and the target pixel is the prohibited pixel, determining the non-formation value as the pixel value of the print pixel corresponding to the target pixel.

According to another aspect, the disclosure provides a non-transitory computer readable storage medium storing a set of program instructions for a control apparatus. The control apparatus is configured to cause a print executing section to perform printing. The printing executing section is configured to form, on a print medium, M number of types of dots. M is an integer greater than or equal to two (2). The M number of types of dots include dot of a first type having a minimum size and dot of a second type having a size greater than the dot of the first type. The program instructions, when executed by a computer provided in the control apparatus, cause the computer to perform:

acquiring target image data containing a plurality of pixels;

generating print data containing a plurality of print pixels, the print pixels corresponding to the pixels, respectively, the generating the print data determining, for each pixel, a pixel value for the corresponding print pixel; and supplying the print data to the print executing section.

The generating the print data includes:

correcting a pixel value of a target pixel among the plural pixels by using two or more pixel-value error amounts corresponding to two or more neighboring pixels existing at positions neighboring to the target pixel, thereby calculating a corrected pixel value of the target pixel;

by using the pixel value of the target pixel, judging whether or not the target pixel is a prohibited pixel, formation of a dot of at least the first type among the M number of types of dots being prohibited on the print medium at a position corresponding to the prohibited pixel;

determining the pixel value of the print pixel corresponding to the target pixel by using the corrected pixel value of the target pixel and dependently on whether the target pixel is the prohibited pixel; and calculating the pixel-value error amount corresponding to the target pixel by using the pixel value of the print pixel corresponding to the target pixel.

The determining the pixel value of the print pixel corresponding to the target pixel includes:

in a case where the corrected pixel value of the target pixel is within a first range and the target pixel is not the prohibited pixel, determining, as the pixel value of the print pixel corresponding to the target pixel, a first value indicating formation of a dot of the first type;

in a case where the corrected pixel value of the target pixel is within a second range that is different from the first range and the target pixel is not the prohibited pixel, determining, as the pixel value of the print pixel corresponding to the target pixel, a second value indicating formation of a dot of the second type;

in a case where the corrected pixel value of the target pixel is within a specific range that is different from both of the first and second ranges, determining, as the pixel value of the print pixel corresponding to the target pixel, a non-formation value indicating formation of no dots; and in a case where the corrected pixel value of the target pixel is within the first range and the target pixel is the prohibited pixel, determining the non-formation value as the pixel value of the print pixel corresponding to the target pixel.

BRIEF DESCRIPTION OF THE DRAWINGS

The particular features and advantages of the disclosure will become apparent from the following description taken in connection with the accompanying drawings, in which:

FIG. 7 illustrates a mask applied to the gray image data;

FIG. 13 illustrates a specific example of the prohibited pixel judgment process in the third embodiment.

DETAILED DESCRIPTION

Figure 1:
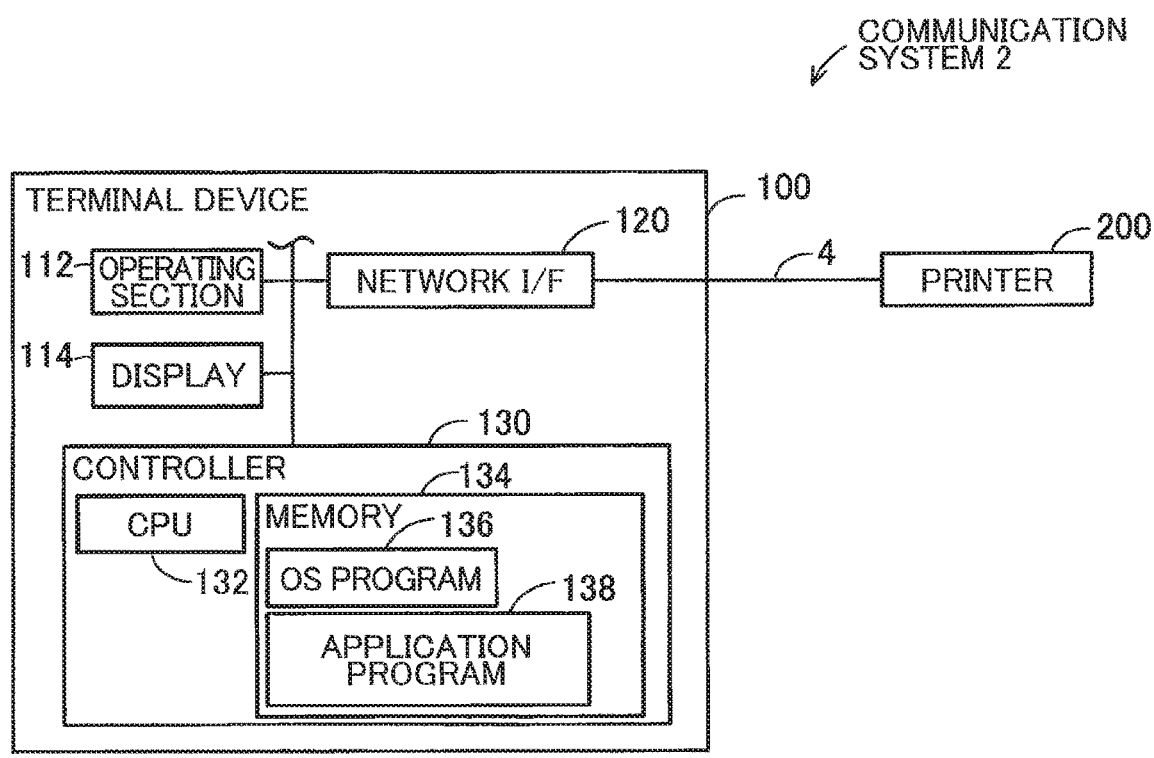
FIG. 1 illustrates a configuration of a communication system according to embodiments.

A control apparatus according to embodiments will be described while referring to the accompanying drawings wherein like parts and components are designated by the same reference numerals to avoid duplicating description.

(First Embodiment)(Configuration of Communication System 2; FIG. 1)

As illustrated in FIG. 1, a communication system 2 includes a terminal device 100 and a printer 200. The terminal device 100 and the printer 200 are connected with each other via a local area network (LAN) cable 4. The terminal device 100 and the printer 200 are capable of communicating with each other via the LAN cable 4.

(Configuration of Terminal Device 100)

The terminal device 100 is a user terminal such as a desktop personal computer (PC), a notebook PC or a mobile terminal. The terminal device 100 includes: an operating section 112; a display 114; a network interface 120; and a controller 130. The operating section 112 includes a plurality of keys. A user can input various instructions to the terminal device 100 by operating the operating section 112. The display 114 displays various pieces of information. The display 114 functions also as a so-called touch panel. That is, the display 114 functions also as the operating section. The network interface 120 is connected with the LAN cable 4.

The controller 130 includes a CPU 132 and a memory 134. The CPU 132 executes various processing according to an operating system (OS) program 136 stored in the memory 134. The memory 134 is configured as a RAM, a ROM or a hard disk. The memory 134 stores not only the OS program 136 but also an application program (which will be referred to simply as an "application" hereinafter) 138. The application 138 is a printer driver for the printer 200 that is a program for generating print data based on RGB image data. The application 138 may be installed to the terminal device 100 from: a server (not illustrated) which is provided on the Internet by a vendor of the printer 200; or a medium which is shipped together with the printer 200.

(Configuration of Printer 200)

The printer 200 is a peripheral device for the terminal device 100, and is capable of executing a printing function. The printer 200 is capable of forming, on a print medium, three types of dots having different sizes. A dot having the largest size, a dot having the second largest size and a dot having the smallest size among the three types of dots will be referred to as a "large dot", a "middle dot" and a "small dot", respectively. In this example, the printer 200 is of an ink jet type, in which an ink jet head is controlled to eject ink to a print medium.

Figure 2:
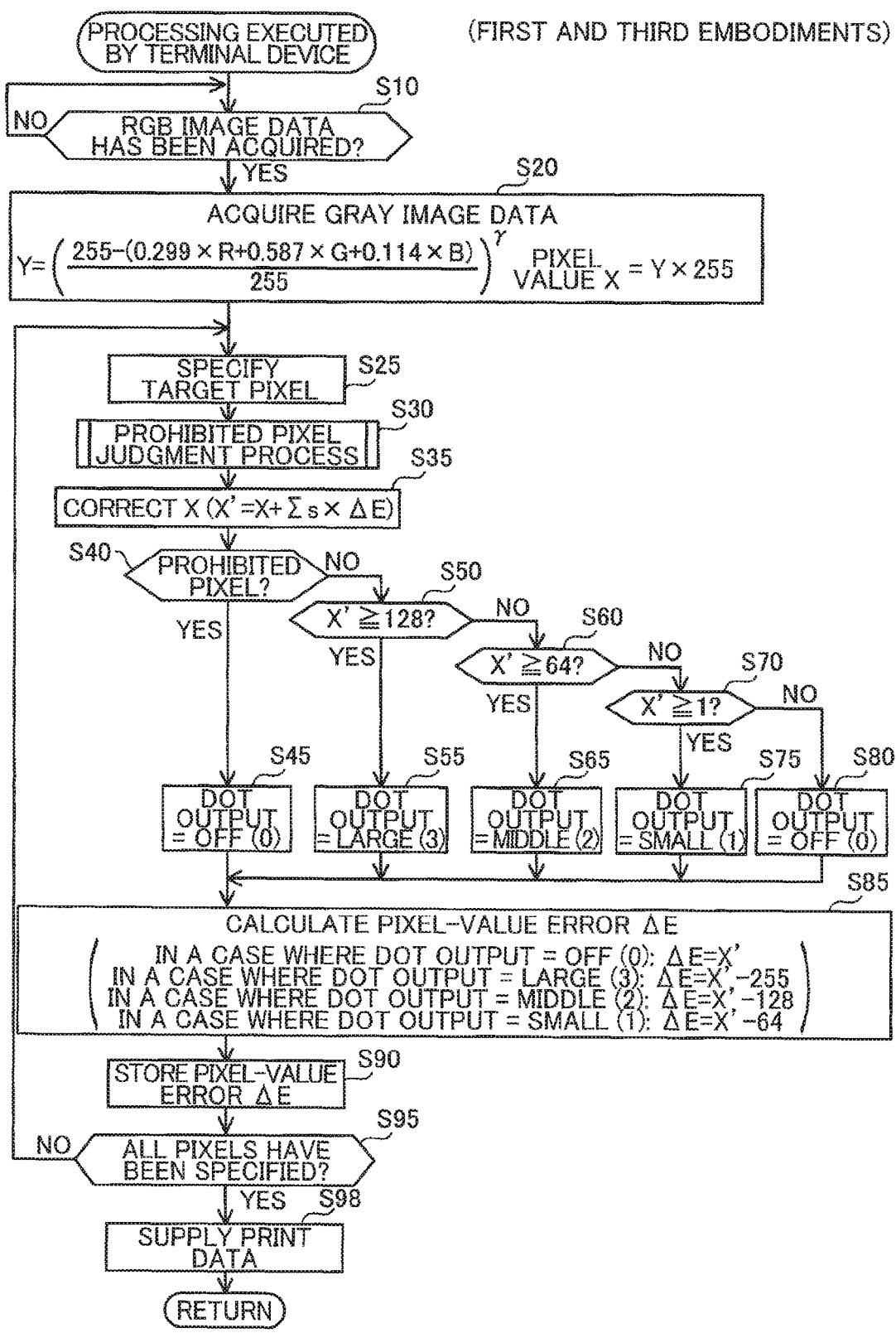
FIG. 2 is a flowchart illustrating a processing executed by a terminal device according to each of a first embodiment and a third embodiment.

(Processing Executed by Terminal Device 100; FIG. 2)

Processing executed by the CPU 132 of the terminal device 100 according to the application 138 will be described with reference to FIG. 2.

In S10, the CPU 132 monitors whether RGB image data expressing an image of a print target has been acquired. When RGB image data stored in the memory 134, for example, is selected by a user, the CPU 132 acquires the RGB image data from the memory 134, whereby results of the judgment in S10 become positive ("YES" in S10) and the processing proceeds to S20. The RGB image data includes a plurality of pixels, each pixel being expressed by R, G and B values, each value being one of 256 gradations.

In S20, the CPU 132 converts the obtained RGB image data into gray image data. More specifically, the CPU 132 calculates a value Y by substituting, in the following expression (1), pixel values (that is, an R value, a G value and a B value) for one pixel among the plurality of pixels included in the RGB image data:

$$Y=\{[255-(0.299 \times R+0.587 \times G+0.114 \times B)]/255\}^{\gamma} \quad (1)$$

The γ value in the expression (1) is a constant that is determined in advance according to the characteristics of the printer 200. Next, in S20, the CPU 132 calculates a value X by substituting the calculated value Y in the following expression (2):

$$X=Y \times 255 \quad (2)$$

The calculated value X is a pixel value of the pixel constituting the gray image data. The pixel value X is within a range of 0 to 255. As the pixel value X increases, the density of the pixel increases. In other words, as the pixel value X increases, color of the pixel becomes closer to black. As the pixel value X decreases, the density of the pixel decreases. In other words, as the pixel value X decreases, color of the pixel becomes closer to white. Thus, each pixel constituting the gray image data is expressed not by three values of R, G and B values, but by a single value indicating a density of the each pixel, that is, a gray value. Also in S20, the CPU 132 calculates the pixel value X for each of the other remaining pixels in the RGB image data in the same manner as described above. As a result, the CPU 132 obtains gray image data including a plurality of pixel values X for the plurality of pixels.

In S25, the CPU 132 specifies one pixel among the plurality of pixels included in the gray image data (which will be referred to as a "target pixel" hereinafter). An order in which the target pixel is specified among the plurality of pixels is determined in advance. More specifically, when the process of S25 is executed for the first time, the CPU 132 specifies, as a target pixel, one pixel that belongs to both of the uppermost row and the leftmost column (a pixel indicating "10" in the gray image data in FIG. 3, for example). When the process of S25 is executed for each of the second and subsequent times, the CPU 132 specifies, as the current target pixel, one pixel that is located to the right of a previous target pixel. When the previous target pixel belongs to the rightmost column, the CPU 132 specifies, as the current target pixel, one pixel that belong to both of the leftmost column and a row that is next to and below the row to which the previous target pixel belongs.

Figure 5:
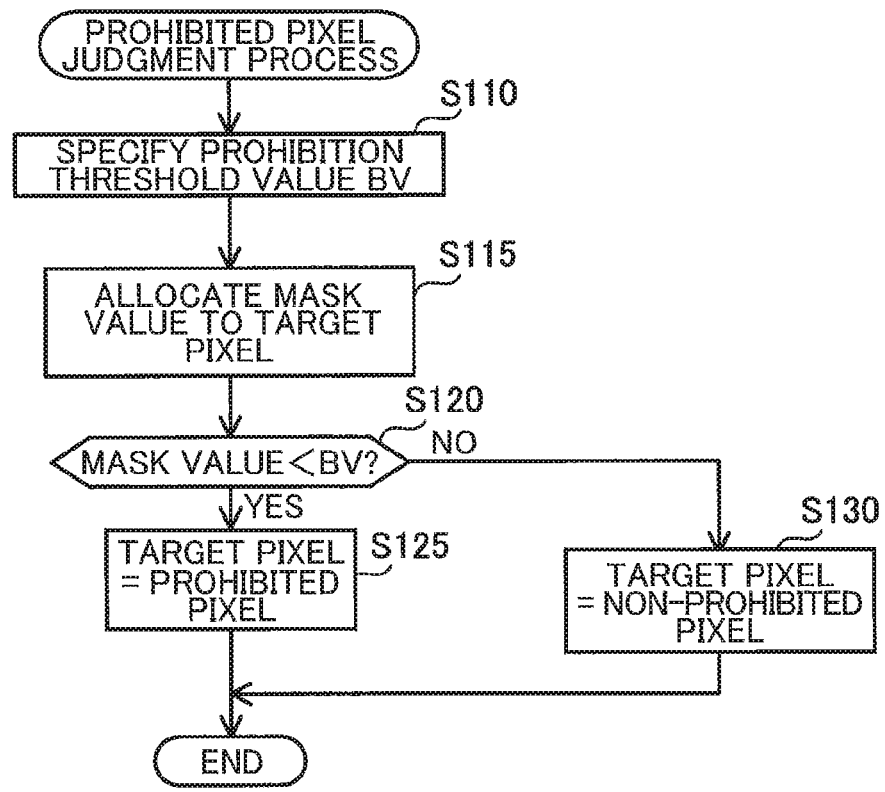
FIG. 5 is a flowchart showing a prohibited pixel judgment process according to each of the first embodiment and a second embodiment.

In S30, the CPU 132 executes a prohibited pixel judgment process (see FIG. 5). More specifically, the CPU 132 uses the pixel value X of the target pixel to judge whether or not the target pixel is a prohibited pixel. In the present embodiment, the prohibited pixel is such a pixel, in which formation of any of a large dot, a middle dot, and a small dot should be prohibited on the print medium at a position corresponding to the target pixel.

Figure 4:
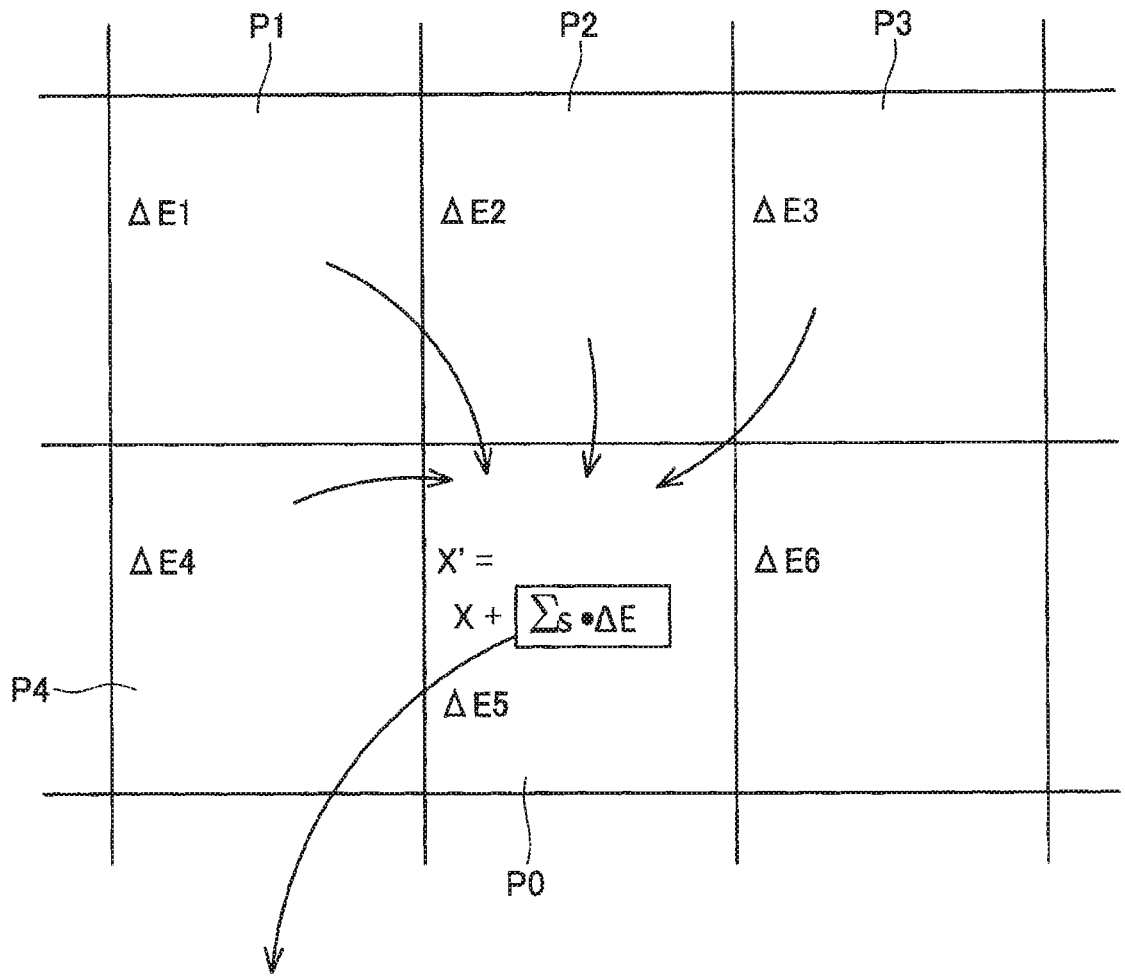
FIG. 4 illustrates how errors are diffused.

Next, in S35, the CPU 132 corrects the pixel value X of the target pixel, thereby calculating a corrected pixel value X'. More specifically, first, the CPU 132 specifies four neighboring pixels that are located near the target pixel. As illustrated in FIG. 4, the four neighboring pixels for the target pixel P0 include: a pixel P1 that is located at an upper left side of the target pixel P0; a pixel P2 located at an upper side of the target pixel P0; a pixel P3 located at an upper right side of the target pixel P0; and a pixel P4 located at a left side of the target pixel P0.

It is noted that depending on the position of the target pixel, some of the four neighboring pixels cannot be defined for the target pixel. In such a case, the number of the neighboring pixels will become smaller than or equal to three (3).

Next, in S35, the CPU 132 calculates the corrected pixel value X' according to the following expression (3) by using the pixel value X of the target pixel and four pixel-value errors ΔE corresponding to the specified four neighboring pixels:

$$X'=X+\Sigma_s \times \Delta E \quad (3)$$

The symbol "s" in the expression (3) means constants defined for the respective neighboring pixels. More specifically, "s" for the pixels P1 and P3 are equal to ⅛, and "s" for the pixels P2 and P4 are equal to ⅜. Accordingly, the expression (3) can be expressed as follows: X'=X+(⅛)ΔE1+(⅜)ΔE2+(⅛)ΔE3+(⅜)ΔE4, wherein ΔE1, ΔE2, ΔE3, and ΔE4 are pixel-value errors ΔE corresponding to the neighboring pixels P1-P4, respectively.

Next, in S40, the CPU 132 uses results of the determination in S30 to judge whether or not the target pixel is a prohibited pixel. When the CPU 132 determines that the target pixel is a prohibited pixel ("YES" in S40), the processing proceeds to S45. On the other hand, when the CPU 132 determines that the target pixel is not a prohibited pixel ("NO" in S40), the processing proceeds to S50.

In S45, the CPU 132 determines, as a pixel value of a print pixel corresponding to the target pixel, a value "0" indicating that no dot should be formed for the print pixel. The print pixel is a pixel constituting print data.

In S50, the CPU 132 judges whether or not the corrected pixel value X' is higher than or equal to 128. When the CPU 132 determines that the corrected pixel value X' is higher than or equal to 128 ("YES" in S50), the processing proceeds to S55. On the other hand, when the CPU 132 determines that the corrected pixel value X' is lower than 128 ("NO" in S50), the processing proceeds to S60.

In S55, the CPU 132 determines, as the pixel value of the print pixel corresponding to the target pixel, a value "3" indicating that a large dot should be formed for the print pixel.

In S60, the CPU 132 judges whether or not the corrected pixel value X' is higher than or equal to 64. When the CPU 132 determines that the corrected pixel value X' is higher than or equal to 64 ("YES" in S60), the processing proceeds to S65. On the other hand, when the CPU 132 determines that the corrected pixel value X' is lower than 64 ("NO" in S60), the processing proceeds to S70.

In S65, the CPU 132 determines, as the pixel value of the print pixel corresponding to the target pixel, a value "2" indicating that a middle dot should be formed for the print pixel.

In S70, the CPU 132 judges whether or not the corrected pixel value X' is higher than or equal to one (1). When the CPU 132 determines that the corrected pixel value X' is higher than or equal to one (1) ("YES" in S70), the processing proceeds to S75. On the other hand, when the CPU 132 determines that the corrected pixel value X' is lower than one (1) ("NO" in S70), the processing proceeds to S80.

In S75, the CPU 132 determines, as the pixel value of the print pixel corresponding to the target pixel, a value "1" indicating that a small dot should be formed for the print pixel. The process of S80 is the same as that of S45.

Figure 3:
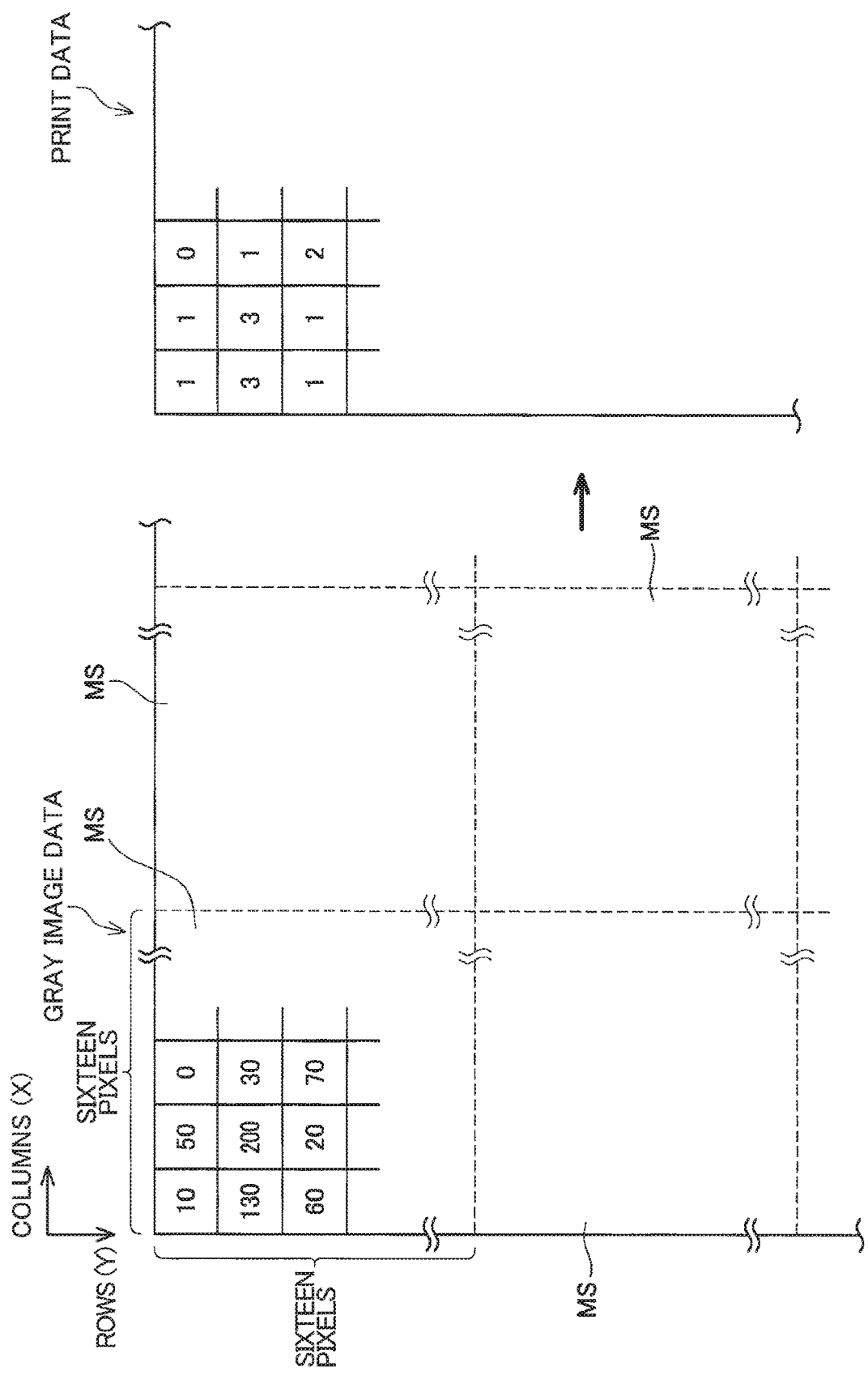
FIG. 3 illustrates the manner how print data is generated based on gray image data.

In this way, the CPU 132 determines, as the pixel value of the print pixel, either one of values "0" to "3" that is dependent on the amount of the corrected pixel value X' (S50 to S80). It is noted, however, that when the target pixel is a prohibited pixel ("YES" in S40), the CPU 132 determines the value of "0" as the pixel value of the print pixel (S45) even though the corrected pixel value X' is within the range of one (1) or more, which indicates that either one of "1" to "3" should be determined as the pixel value of the print pixel. For example, FIG. 3 illustrates nine pixels in the gray image data and nine print pixels in the corresponding print data, and illustrates how the pixel value for each print pixel is determined to either one of "0" to "3".

In S85, the CPU 132 calculates a pixel-value error $\Delta E$ corresponding to the target pixel according to one of the following expressions (4)-(7) that is selected dependently on the pixel value of the print pixel corresponding to the target pixel (that is, one of "0" to "3"):

In a case where a dot output (pixel value of the print pixel) is equal to "OFF" (0): $\Delta E = X'$ (4)

In a case where the dot output is equal to "large" (3): $\Delta E = X' - 255$ (5)

In a case where the dot output is equal to "middle" (2): $\Delta E = X' - 128$ (6)

In a case where the dot output is equal to "small" (1): $\Delta E = X' - 64$ (7)

In S90, the CPU 132 stores the calculated pixel-value error $\Delta E$ in the memory 134.

In S95, the CPU 132 judges whether or not all the pixels included in the gray image data have been specified as target pixels. That is, the CPU 132 judges whether or not the processes in S30 to S90 have been completed to all the pixels. In a case where the CPU 132 has already specified all the pixels as the target pixels ("YES" in S95), the processing proceeds to S98. When there remain any pixels which have not yet been specified as the target pixels among all pixels ("NO" in S95), the processing returns to S25 to specify a next pixel as the target pixel.

In S98, the CPU 132 supplies generated print data to the printer 200 via the network interface 120. Consequently, the CPU 132 can control the printer 200 to print an image expressed by the print data. When execution of the process of S98 has been completed, the processing returns to S10.

(Prohibited Pixel Judgment Process; FIG. 5)

Figure 6A:
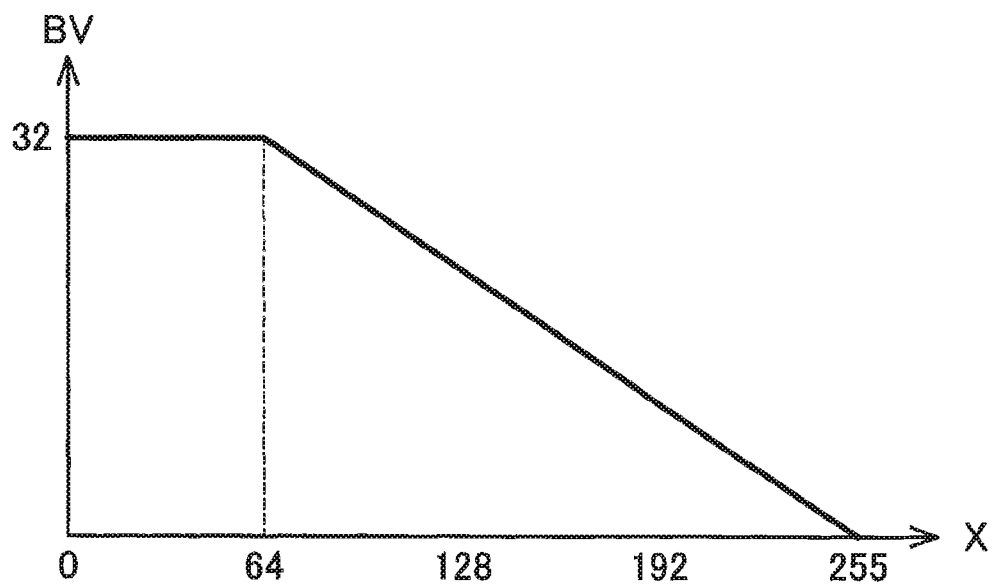
FIG. 6A is a graph used to specify a prohibition threshold value in the first embodiment.

The prohibited pixel judgment process in S30 shown in FIG. 2 will be described with reference to FIG. 5. In S110, the CPU 132 specifies a prohibition threshold value BV that corresponds to the pixel value X of the target pixel according to a graph shown in FIG. 6A. The prohibition threshold value BV is an index value that will be used in S120 (to be described later) to judge whether or not the target pixel is a prohibited pixel. As illustrated in FIG. 6A, when the pixel value X is within a range of "0" to "64", the prohibition threshold value BV is fixed at a value of "32". When the pixel value X is within a range of "64" to "255", as the pixel value X increases, the prohibition threshold value BV decreases monotonically. Particularly when the pixel value X becomes equal to 255 which indicates the highest density that can be expressed by the target pixel, the prohibition threshold value BV reaches "0".

In S115, the CPU 132 allocates a mask value to the target pixel. More specifically, the CPU 132 first prepares a mask MS including 256 elements arranged in sixteen (16) rows and sixteen (16) columns FIG. 7 illustrates an example of the mask MS. Each of the 256 integers in the range of "0" to "255" is allocated to one of the 256 elements in the mask MS. For example, the integers "0" to "255" may be arranged randomly in the mask MS. Or, the integers "0" to "255" may be arranged in the mask MS through a dither method that is used for generating a dither matrix. The dither method in this case may be a method for creating a blue noise mask having blue noise characteristics.

Next, the CPU 132 allocates, to the target pixel, a mask value that is an integer among the 256 integers arranged within the generated mask MS. More specifically, as illustrated in FIG. 3, the CPU 132 arranges a plurality of the same masks MS on the gray image data such that no gaps are formed between neighboring masks MS. The CPU 132 allocates, to the target pixel, a mask value that is located at a position corresponding to the target pixel.

Processing of allocating the mask value will be described below in more detail. As shown in FIG. 3, in the gray image data, a rightward/left direction is defined as an X axis, and an upward/downward direction is defined as a Y axis. In this case, the position of the target pixel is represented by a combination of the X coordinate and the Y coordinate of the target pixel. As illustrated in FIG. 7, values C are allocated to the respective columns in the mask MS such that the values C of 0, 1, 2, . . . , 13, 14 and 15 are arranged in this order from the left to the right. Values R are allocated to the respective rows in the mask MS such that the values R of 0, 1, 2, . . . , 13, 14 and 15 are arranged in this order from the top to the bottom. In this case, the position, at which each mask value is located in the mask MS, can be specified by a combination of the values C and R. Accordingly, the CPU 132 divides the X coordinate of the target pixel by sixteen (16) to obtain a remainder and sets the remainder as the value C, and divides the Y coordinate of the target pixel by sixteen (16) to obtain a remainder and sets the remainder as the value R. Then, the CPU 132 allocates, to the target pixel, the mask value specified by a combination of the determined values C and R.

In S120, the CPU 132 judges whether or not the mask value allocated in S115 to the target pixel is lower than the prohibition threshold value BV. When the CPU 132 determines that the mask value is lower than the prohibition threshold value BV ("YES" in S120), the processing proceeds to S125. On the other hand, when the CPU 132 determines that the mask value is higher than or equal to the prohibition threshold value BV ("NO" in S120), the processing proceeds to S130.

In S125, the CPU 132 determines that the target pixel is a prohibited pixel. In S130, the CPU 132 determines that the target pixel is such a pixel that is not a prohibited pixel (which will be referred to as a "non-prohibited pixel" hereinafter). FIG. 7 shows an exemplary case in which pixel values X of all pixels in the gray image data are equal to 159 and therefore the prohibition threshold values BV are equal to "15" for all the pixels. In the figure, the mask value allocated to each pixel position is illustrated at the corresponding pixel position. The mask values lower than the prohibition threshold value BV of "15" are circled, while the mask values higher than or equal to the prohibition threshold value BV of "15" are not circled. Accordingly, those pixels, to which mask values lower than 15 are allocated, are determined as prohibited pixels. On the other hand, other pixels, to which mask values higher than or equal to 15 are allocated, are determined as non-prohibited pixels. After having completed the process of S125 or S130, the CPU 132 ends the processing in FIG. 5.

As described above, all the integers in the range of "0" to "255" are arranged in the mask MS. When the mask value for the target pixel is lower than the prohibition threshold value BV ("YES" in S120), the target pixel is determined as a prohibited pixel (S125). Hence, the probability that the target pixel is determined as a prohibited pixel is represented by an expression of "BV/256" that is determined by dividing the prohibition threshold value BV by "256". This indicates that as the prohibition threshold value BV increases, the probability that the target pixel is determined as a prohibited pixel increases. As illustrated in FIG. 6A, when the pixel value X is within the range of "0" to "64" (which will be referred to as a "low pixel value range" hereinafter), the prohibition threshold value BV is fixed at the relatively large value of "32". On the other hand, when the pixel value X is within the range of "64" to "255" (which will be referred to as a "high pixel value range" hereinafter), as the pixel value X increases, the prohibition threshold value BV decreases. Hence, when the pixel value X is within the low pixel value range, the target pixel is determined as a prohibited pixel with relatively high probability. As apparent from the expression (3) used in S35 of FIG. 2, the corrected pixel value X' is correlated with the pixel value X. That is, when the pixel value X is within the low pixel value range, the corrected pixel value X' is also highly likely to be within the low pixel value range. Accordingly, the corrected pixel value X' is highly likely to be within the range in which a small dot should be formed (i.e., the range of "1" to "64"; "NO" in S60 and "YES" in S70 in FIG. 2) (S75 in FIG. 2). In other words, such a target pixel, whose corrected pixel value X' falls within the range in which a small dot should be formed, is determined as a prohibited pixel with relatively high probability. On the other hand, when the pixel value X is within the high pixel value range, the target pixel is determined as a prohibited pixel with relatively low probability. That is, such a target pixel whose corrected pixel value X' falls within the range in which a middle dot or a large dot should be formed (i.e., the range of "64" to "255"; "YES" in S50 or S60 in FIG. 2) is determined as a prohibited pixel with relatively low probability.

When the pixel value X is within the high pixel value range, as the difference between the pixel value X and the boundary value (threshold) "64" between the low pixel value range and the high pixel value range increases (that is, as the pixel value X increases), the prohibition threshold value BV decreases, and therefore the probability that the target pixel is determined as a prohibited pixel decreases. When the difference between the pixel value X and the threshold value "64" is large, the corrected pixel value X' is highly likely to be within the range in which a large dot should be formed (i.e., the range of "128" to "255"; "YES" in S50 in FIG. 2). When the difference between the pixel value X and the threshold value "64" is small, the corrected pixel value X' is highly likely to be within the range in which a middle dot should be formed (i.e., the range of "64" to "128"; "NO" in S50 and "YES" in S60 in FIG. 2).

To summarize the above description, according to the present embodiment, formation of a small dot is prohibited with probability higher than formation of a middle dot is. Formation of a middle dot is prohibited with probability higher than formation of a large dot is. When the pixel value X of the target pixel is equal to "255" indicating the maximum density that can be represented by the pixel value, the prohibition threshold value BV is equal to "0". Accordingly, the target pixel having the pixel value X of 255 is always determined as being a non-prohibited pixel.

Advantages of Present Embodiment

Figure 8:
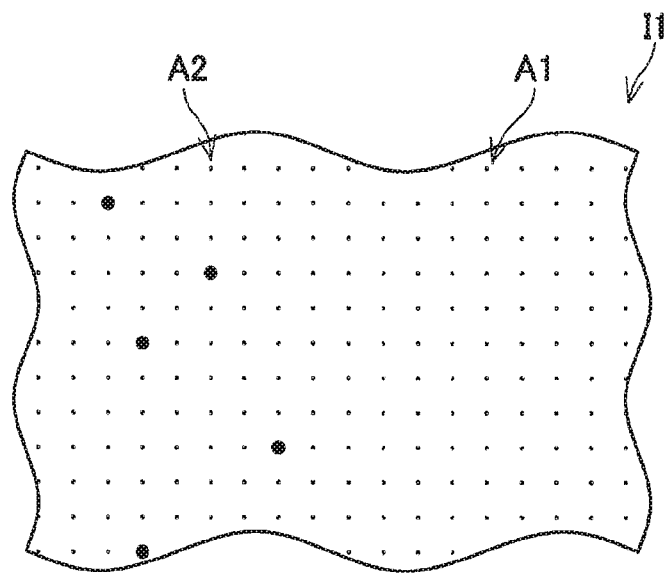
FIG. 8 is an example of a printed image obtained according to a comparative example.
Figure 9:
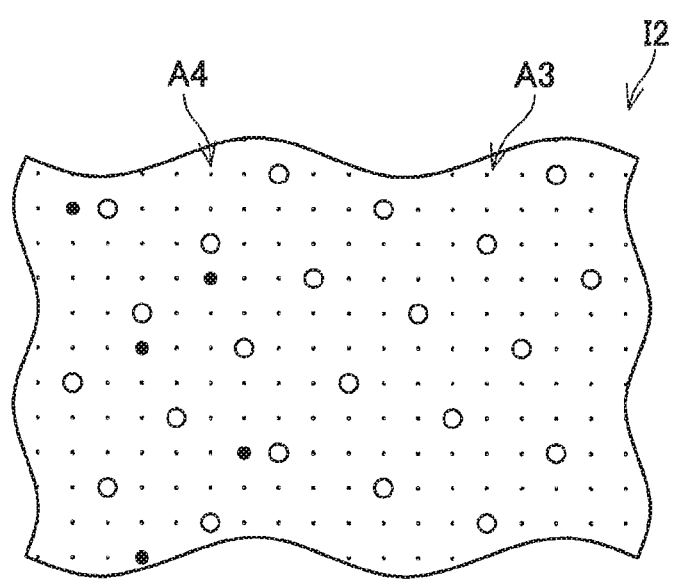
FIG. 9 is an example of a printed image obtained according to the first embodiment.

With reference to FIGS. 8 and 9, advantages of the method of the present embodiment will be described in comparison with a method of a comparative example. According to the method of the comparative example, the process of FIG. 2 is executed, without performing the processes in S30, S40 and S45. FIG. 8 illustrates an image I1 printed on a print medium according to the method of the comparative example. The printed image I1 includes an area A1 and an area A2. In the area A1, dots are formed at all the pixel positions to express a solid image. The types of the dots formed in the area A1 are small dots only. Also in the area A2, dots are formed at all the pixel positions so as to express another solid image. However, in contrast to the area A1, the types of the dots formed in the area A2 are both of small dots and middle dots. A viewer of the printed image I1 may recognize a boundary between the areas A1 and A2 because the grain recognition degree of the area A1 is relatively low, but the grain recognition degree of the area A2 is relatively high. Consequently, the viewer may feel that the image I1 has low image quality.

FIG. 9 illustrates an image I2 printed on a print medium according to the method of the present embodiment. The printed image I2 includes an area A3 and an area A4. Similarly to the area A1, only small dots are formed in the area A3. However, in contrast to the area A1, no dots are formed at some of the pixel positions in the area A3. The pixel positions where no dots are formed correspond to the prohibited pixels (which will be referred to as "prohibited positions" hereinafter), and are indicated by hollow circles in FIG. 9. Similarly to the area A2, both of small dots and middle dots are formed in the area A4. However, in contrast to the area A2, no dots are formed at some of the pixel positions in the area A4. Thus, in contrast to the printed image I1 in the comparative example, the printed image I2 has the prohibited positions where no dots are formed. More specifically, in contrast to the area A1 in the comparative example, dots are not formed at all the pixel positions in the area A3, and therefore the area A3 does not represent a solid image. Similarly, in contrast to the area A2 in the comparative example, dots are not formed at all the pixel positions in the area A4, and therefore the area A4 does not represent a solid image. Accordingly, the grain recognition degree of the area A3 is greater than the area A1. The grain recognition degree of the area A4 is higher than the area A2.

It is noted that as the grain recognition degree of an area formed through the method of the comparative example is lower, the amount, by which the grain recognition degree increases through prohibition of formation of dots, tends to increase. Because the grain recognition degree of the area A1 is lower than that of the area A2, the amount, by which the grain recognition degree increases from the area A1 to the area A3, is greater than the amount, by which the grain recognition degree increases from the area A2 to the area A4. Therefore, the difference in the grain recognition degrees between the two areas A3 and A4 in the printed image I2 is smaller than the difference in the grain recognition degrees between the two areas A1 and A2 in the printed image I1. It becomes difficult for the viewer to recognize the boundary between the two areas A3 and A4 in the printed image I2. In this way, according to the present embodiment, the image quality of the printed image I2 can be improved.

Generally, difference between the grain recognition degrees of two adjacent areas decreases as the probability that formation of dots is prohibited in the two areas increases. In this respect, assume that an image printed through the method of the comparative example has two adjacent areas including: an area which is composed of both of middle dots and large dots and therefore which has a relatively high grain recognition degree due to the difference in size between the middle dots and large dots; and another area which is composed of dots of a single size (middle dots or large dots) only and therefore which has a relatively low grain recognition degree. A viewer recognizes the boundary between the two adjacent areas. However, by prohibiting formation of dots in both of these two adjacent areas according to the method of the embodiment, it becomes difficult for the viewer to recognize the boundary.

For example, it is assumed that an image printed through the method of the comparative example has three areas including: a middle dot area composed of middle dots only; a middle-and-large-dot mixed area composed of both of middle dots and large dots; and a large dot area composed of large dots only. The middle dot area, middle-and-large-dot mixed area, and large dot area are arranged in this order such that a border is defined between the middle dot area and the middle-and-large-dot mixed area, and a border is defined between the middle-and-large-dot mixed area and the large dot area. In this image, the grain recognition degrees of the middle dot area and the large dot area are relatively low, but the grain recognition degree of the middle-and-large-dot mixed area is relatively high due to the difference in size between the middle dots and the large dots. A user recognizes both of the two borders. However, by prohibiting formation of dots in all the three areas according to the method of the present embodiment, it becomes difficult for the viewer to recognize the borders.

Generally, difference between small dots and middle dots can be recognized more easily than difference between middle dots and large dots. This is because color of an area composed of small dots and middle dots is thinner than color of an area composed of middle dots and large dots. In this respect, it is assumed that an image printed through the method of the comparative example has four areas including: a small dot area composed of small dots only; a small-and-middle-dot mixed area composed of both of small dots and middle dots; the middle dot area composed of middle dots only; and the middle-and-large-dot mixed area composed of both of middle dots and large dots. The small dot area, small-and-middle-dot mixed area, middle dot area, and middle-and-large-dot mixed area are arranged in this order such that a first boundary is defined between the small dot area and the small-and-middle-dot mixed area, and a second boundary is defined between the middle dot area and the middle-and-large-dot mixed area. A viewer recognizes the first boundary more easily than the second boundary. It is noted that according to the method of the present embodiment, as described above, formation of small dots is prohibited with probability higher than formation of middle dots is. Formation of middle dots is prohibited with probability higher than formation of large dots is. According to the method of the present embodiment, therefore, formation of dots is prohibited at a region surrounding the first boundary with relatively high probability because the region surrounding the first boundary is composed of small dots and middle dots. Consequently, it becomes difficult for the viewer to recognize the first boundary that would be recognized more easily than the second boundary if formation of dots is not prohibited. Formation of dots is prohibited at a region surrounding the second boundary with relatively low probability because the region surrounding the second boundary is composed of middle dots and large dots. Consequently, occurrence of undesirable corruption of an image, which will possibly occur through prohibition of formation of dots, is suppressed at the second boundary that would be recognized with more difficulty than the first boundary even if formation of dots is not prohibited.

(Correspondence)

The terminal device 100 and the printer 200 are examples of a "control apparatus" and a "print executing section", respectively. The range of higher than or equal to 1 and lower than 64, the range of higher than or equal to 64 and lower than 128, and the range lower than 1 are examples of a "first range", a "second range" and a "specific range", respectively. 1, 2 and 0 are examples of a "first value", a "second value" and a "non-formation value", respectively. The small dots and the middle dots are examples of "dots of a first type" and "dots of a second type", respectively. The large dots, middle dots and small dots are examples of "dots of the M number of types". 64, the prohibition threshold value BV and 255 are examples of the "first threshold value", "second threshold value" and "value indicating the highest density that can be represented by the target pixel", respectively.

Second Embodiment

Differences of a second embodiment from the first embodiment will be described below. In the present embodiment, the CPU 132 executes the processing shown in FIG. 10 in place of the processing of FIG. 2. In the present embodiment, a prohibited pixel is defined as such a pixel for which formation of a small dot is prohibited, but formation of a large dot or formation of a middle dot is not prohibited. In other words, according to the present embodiment, only formation of a small dot is prohibited.

Figure 10:
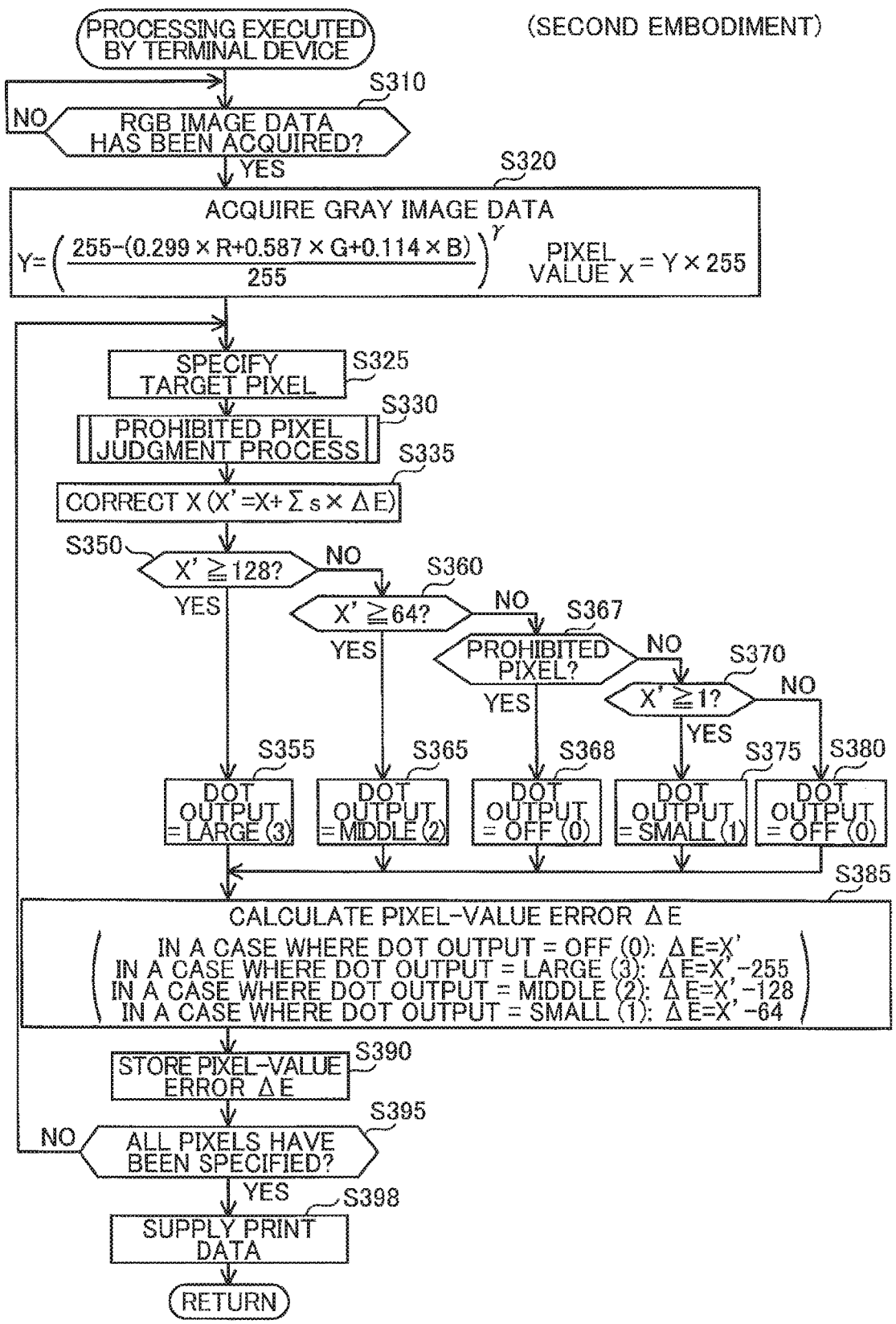
FIG. 10 is a flowchart illustrating the processing executed by the terminal device according to the second embodiment.

(Processing Executed by Terminal Device 100; FIG. 10)

The processing executed by the CPU 132 of the terminal device 100 according to the application 138 will be described with reference to FIG. 10. Processes in S310 to S335 are the same as those in S10 to S35 of FIG. 2, respectively.

Processes in S350 to S380 are the same as those in S50 to S65, S40, S45 and S70 to S80, respectively. Thus, in the present embodiment, even when the target pixel is a prohibited pixel, formation of a large dot or formation of a middle dot is not prohibited (S355 and S365). Processes in S385 to S398 are the same as those in S85 to S98 of FIG. 2, respectively. When the CPU 132 has completed the process of S398, the procedure returns to S310.

Advantages of Present Embodiment

According to the present embodiment, the terminal device 100 prohibits formation of only a small dot (S368) by determining that the target pixel is a prohibited pixel ("YES" in S367). This can suppress formation of such an area in which a small dot is formed at each of all the pixel positions to express a solid image. As a result, it becomes difficult for a viewer of a printed image to recognize a boundary between the subject area and an area neighboring to the subject area. Consequently, image quality of the printed image can be improved.

Figure 11:
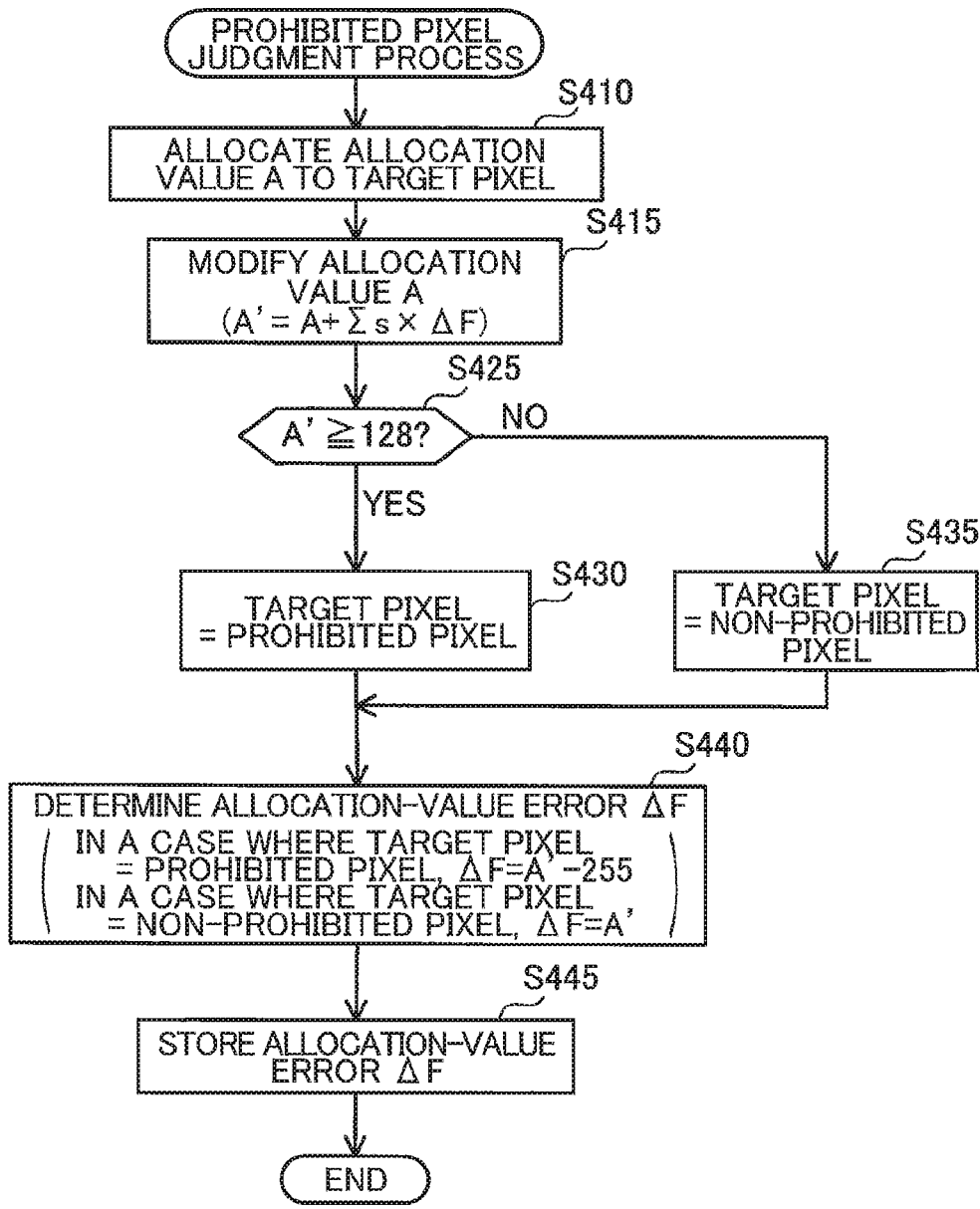
FIG. 11 is a flowchart showing the prohibited pixel judgment process according to the third embodiment.

(Third Embodiment)(Prohibited Pixel Judgment Process; FIG. 11)

Figure 12:
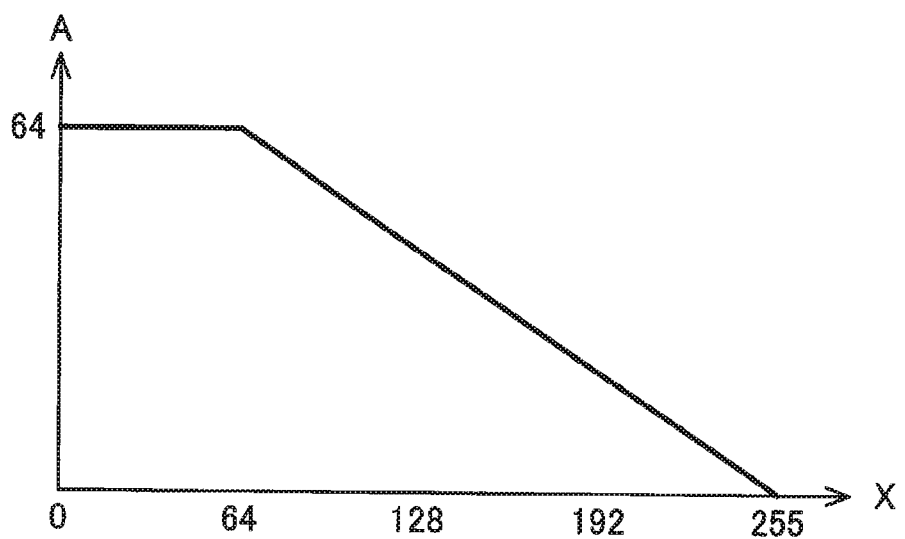
FIG. 12 is a graph used to specify an allocation value in the third embodiment.

Differences of a third embodiment from the first embodiment will be described below. In the present embodiment, the CPU 132 performs a prohibited pixel judgment process shown in FIG. 11 in place of the prohibited pixel judgment process shown in FIG. 5. First, in S410 of FIG. 11, the CPU 132 allocates an allocation value A to the target pixel according to a graph shown in FIG. 12. The allocation value A is an index value used for judging whether or not the target pixel is a prohibited pixel. As illustrated in FIG. 12, when the pixel value X is within the range of "0" to "64", the allocation value A is fixed at a value of "64". On the other hand, when the pixel value X is within the range of "64" to "255", as the pixel value X increases, the allocation value A decreases monotonically. It is noted that according to a modification, when the pixel value X is within the range of "0" to "64", the allocation value A may be fixed at any other arbitral value such as "16", for example. In this modification, as the pixel value increases from 64 to 255, the allocation value will decrease from the value, at which the allocation value is fixed when the pixel value is in the range of 0 to 64.

In S415, the CPU 132 modifies the allocation value A into a modified allocation value A'. More specifically, the CPU 132 calculates the modified allocation value A' according to the following expression (8) by using allocation-value errors $\Delta F$ of the four neighboring pixels:

$$A' = A + \Sigma_s \times \Delta F \quad (8)$$

It is noted that the neighboring pixels defined for the expression (8) are the same as the neighboring pixels P1-P4 defined for the expression (3) used in S35 of FIG. 2. The symbol "s" in the expression (8) indicates the same constants for the respective neighboring pixels as the symbol "s" in the expression (3) used in S35 of FIG. 2 does. Accordingly, the expression (8) can be expressed as follows: $A' = A + (\frac{1}{8})\Delta F1 + (\frac{3}{8})\Delta F2 + (\frac{1}{8})\Delta F3 + (\frac{3}{8})\Delta F4$, wherein $\Delta F1$, $\Delta F2$, $\Delta F3$, and $\Delta F4$ are allocation-value errors $\Delta F$ corresponding to the neighboring pixels P1-P4, respectively.

In S425, the CPU 132 judges whether or not the modified allocation value A' is higher than or equal to 128. When the CPU 132 determines that the modified allocation value A' is higher than or equal to the value of "128" ("YES" in S425), the processing proceeds to S430. On the other hand, when the CPU 132 determines that the modified allocation value A' is lower than 128 ("NO" in S425), the processing proceeds to S435. It is noted that according to modifications, the threshold value used in S425 may be a predetermined value different from 128, or may be such a value that is randomly determined every time when the processing in FIG. 11 is executed. Processes in S430 and S435 are the same as those in S125 and S130, respectively, of FIG. 5.

In S440, the CPU 132 determines the allocation-value error $\Delta F$ corresponding to the target pixel by using one of the following expressions (9) and (10) that is dependent on whether or not the target pixel is a prohibited pixel:

When the target pixel is a prohibited pixel: $\Delta F = A' - 255$ (9)

When the target pixel is not a prohibited pixel: $\Delta F = A'$ (10)

More specifically, when the CPU 132 determines that the target pixel is a prohibited pixel, the CPU 132 determines a difference between the modified allocation value A' and 255 as the allocation-value error $\Delta F$ corresponding to the target pixel. On the other hand, when the CPU 132 determines that the target pixel is not a prohibited pixel, the CPU 132 determines the modified allocation value A' as the allocation-value error $\Delta F$ corresponding to the target pixel. In S445, the CPU 132 stores the determined allocation-value error $\Delta F$ in the memory 134. After having completed the process of S445, the CPU 132 ends the processing in FIG. 11.

As apparent from the expression (8) used in S415 of FIG. 11, the modified allocation value A' is correlated with the allocation value A. The target pixel is determined as a prohibited pixel when the modified allocation value A' corresponding to the target pixel is higher than or equal to 128. Hence, as the allocation value A increases, the probability that the target pixel is determined as a prohibited pixel increases. As illustrated in FIG. 12, when the pixel value X is within the low pixel value range, the allocation value A is fixed at the relatively high value "64". On the other hand, when the pixel value X is within the high pixel value range, as the pixel value X increases, the allocation value A decreases. Hence, when the pixel value X is within the low pixel value range, the target pixel is determined as a prohibited pixel with relatively high probability. As described above, when the pixel value X is within the low pixel value range, the corrected pixel value X' is highly likely to be within the range for which a small dot should be formed. That is, such a target pixel, whose corrected pixel value X' falls within the range in which a small dot should be formed, is determined as a prohibited pixel with relatively high probability. On the other hand, when the pixel value X is within the high pixel value range, the target pixel is determined as a prohibited pixel with relatively low probability. That is, such a target pixel, whose corrected pixel value X' falls within the range in which middle or large dots should be formed, is determined as a prohibited pixel with relatively low probability.

In addition, when the pixel value X is within the high pixel value range, as a difference between the pixel value X and the boundary value "64" between the low pixel value range and the high pixel value range increases, that is, as the pixel value X increases, the allocation value A decreases, and accordingly, the probability that the target pixel is determined as a prohibited pixel decreases. When the difference between the pixel value X and the threshold value "64" is large, the corrected pixel value X' is highly likely to be within the range in which a large dot should be formed (i.e., a range of "128" to "255"; "YES" in S50 in FIG. 2). When the difference between the pixel value X and the threshold value "64" is small, the corrected pixel value X' is highly likely to be within the range in which a middle dot should be formed (i.e., a range of "64" to "128"; "NO" in S50 and "YES" in S60 in FIG. 2).

To summarize the above description, in the present embodiment, formation of small dots is prohibited with probability higher than formation of middle dots is. Formation of middle dots is prohibited with probability higher than formation of large dots is.

(Specific Example of Prohibited Pixel Judgment Process; FIG. 13)

A specific example of the prohibited pixel judgment process will be described with reference to FIG. 13. Arrows in FIG. 13 indicate how parts of the allocation-value errors $\Delta F$ are diffused to neighboring pixels. As illustrated in FIG. 13, all of the pixel values X of pixels P10 to P23 are equal to 64. Hence, the allocation values A for all the pixels P10-P23 are equal to 64 (S410 in FIG. 11 and FIG. 12).

For the pixel P10, the modified allocation value A' is equal to 64 ("NO" in S425). Accordingly, the pixel P10 is determined as a non-prohibited pixel. The allocation-value error $\Delta F$ corresponding to the pixel P10 is equal to 64 (S440).

For the pixel P11, the modified allocation value A' is equal to 88 which is a sum of 64 and 24 ("NO" in S425).

Accordingly, the pixel P11 is determined as a non-prohibited pixel (S435). The allocation-value error ΔF corresponding to the pixel P11 is equal to 88 (S440).

For the pixel P12, the modified allocation value A' is equal to 97 which is a sum of 64 and 33 ("NO" in S425). Accordingly, the pixel P12 is determined as a non-prohibited pixel (S435). The allocation-value error ΔF corresponding to the pixel P12 is equal to 97 (S440).

For the pixel P13, the modified allocation value A' is equal to 100 which is a sum of 64 and 36 ("NO" in S425). Accordingly, the pixel P13 is determined as a non-prohibited pixel (S435). The allocation-value error ΔF corresponding to the pixel P13 is equal to 100 (S440).

For the pixel P14, the modified allocation value A' is equal to 102 which is a sum of 64 and 38 ("NO" in S425). Accordingly, the pixel P14 is determined as a non-prohibited pixel (S435). The allocation-value error ΔF corresponding to the pixel P14 is equal to 102 (S440).

For the pixel P20, the modified allocation value A' is equal to 99 which is a sum of 64, 24 and 11 ("NO" in S425). Accordingly, the pixel P21 is determined as a non-prohibited pixel (S435). The allocation-value error ΔF corresponding to the pixel P20 is equal to 99 (S440).

For the pixel P21, the modified allocation value A' is equal to 154 which is a sum of 64, 8, 33, 12 and 37 ("YES" in S425). Accordingly, the pixel P21 is determined as a prohibited pixel (S430). The allocation-value error ΔF corresponding to the pixel P21 is equal to −101 (S440).

For the pixel P22, the modified allocation value A' is equal to 86 which is a sum of 64, 11, 36, 13 and −38 ("NO" in S425). Accordingly, the pixel P22 is determined as a non-prohibited pixel (S435). The allocation-value error ΔF corresponding to the pixel P22 is equal to 86 (S440).

For the pixel P23, the modified allocation value A' is equal to 159 which is a sum of 64, 12, 38, 13 and 32 ("YES" in S425). Accordingly, the pixel P23 is determined as a prohibited pixel (S430).

Thus, even though the allocation value A for each of the pixels P10 to P23 is less than or equal to 128, through accumulation of portions of the allocation-value errors ΔF diffused from neighboring pixels, the modified allocation value A' can become higher than or equal to 128. Consequently, prohibited pixels can appear.

Advantages of Present Embodiment

In the present embodiment, similarly to the first embodiment, when the terminal device 100 determines that the target pixel is a prohibited pixel ("YES" in S40 of FIG. 2), the terminal device 100 prohibits formation of any of a large dot, a middle dot and a small dot (S45). Consequently, similarly to the first embodiment, image quality of the printed images can be improved. The modified allocation value A', 128 and 255 are examples of a "modified allocation value", a "third threshold value" and a "prescribed value", respectively.

While the description has been made in detail with reference to the specific embodiments thereof, it would be apparent to those skilled in the art that various changes and modifications may be made therein without departing from the spirit and scope of the above described aspects. The modifications of the above-described embodiments will be described below.

(First Modification)

In each of the above-described embodiments, the three types of dots are formed according to the corrected pixel values X'. However, in this modification, two types of dots, or four or more types of dots may be formed according to the corrected pixel values X'. That is, "M" may be an integer higher than or equal to two (2).

(Second Modification)

In each of the embodiments, the number of the neighboring pixels defined in S35 of FIG. 2 to diffuse portions of pixel-value errors ΔE of the corrected pixel values X' to the target pixel is equal to four (4). The number of the neighboring pixels defined in S415 of FIG. 11 to diffuse portions of allocation-value errors ΔF of the modified allocation values A' to the target pixel is also equal to four (4). However, the numbers of the neighboring pixels defined in each of S35 and S415 may be three, or five or more in this modification. That is, the number of the "neighboring pixels" may be two or more.

In addition, in the embodiments, the neighboring pixels defined in S35 to diffuse portions of pixel-value errors ΔE of the corrected pixel values X' to the target pixel are pixels P1-P4. The neighboring pixels defined in S415 to diffuse portions of allocation-value errors ΔF of the modified allocation values A' to the target pixel are also pixels P1-P4. However, the neighboring pixels defined in S35 and S415 may be different from the pixels P1-P4. The neighboring pixels defined in S35 and S415 may be different from each other.

(Third Modification)

In this modification, in place of the pixel value X, a luminance value defined by the following expression (11), for example, may be used:

$$0.299 \times R + 0.587 \times G + 0.114 \times B \qquad (11)$$

In this modification, the threshold values used in S50, S60 and S70 in FIG. 2 may be determined dependently on the correspondence between the pixel value X and the luminance value. That is, the "pixel value of a target pixel" may be such a pixel value that is different from the pixel value X defined according to the expressions (1) and (2).

(Fourth Modification)

Figure 6B:
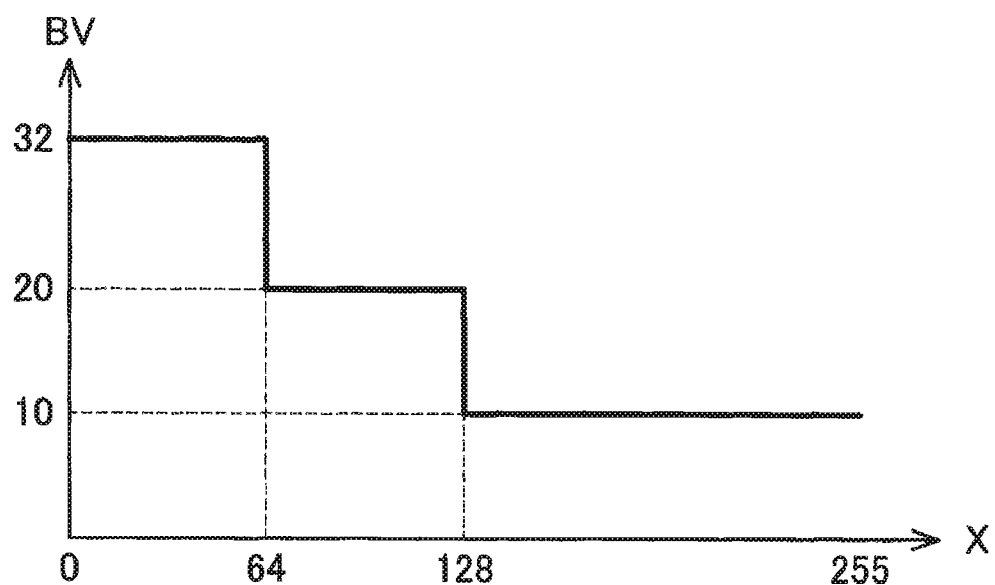
FIG. 6B is a graph used to specify the prohibition threshold value in a fourth modification.

In the graph shown in FIG. 6A, when the pixel value X is within the high pixel value range of "64" to "255", as the pixel value X increases, the prohibition threshold value BV decreases. Contrarily, according to this modification, as illustrated in a graph shown in FIG. 6B, for example, when the pixel value X is within the range of "0" to "64", the prohibition threshold value BV may be fixed at the value "32". When the pixel value X is within the range of "64" to "128", the prohibition threshold value BV may be fixed at the value "20". When the pixel value X is within the range of "128" to "255", the prohibition threshold value BV may be fixed at the value "10". That is, when the pixel value X of the target pixel is within the second range, the target pixel may be determined as a prohibited pixel with second probability such that the second probability does not decrease as the difference between the pixel value of the target pixel and a first threshold value (boundary) between the first range and the second range increases. The target pixel may be determined as a prohibited pixel even when the pixel value X of the target pixel is equal to a value of 255 indicating the highest density representable by the target pixel.

(Fifth Modification)

In each of the above-described embodiments, monochrome printing is executed based on gray image data. However, color printing may be executed in this modification. In this modification, in S20 in FIG. 2, the CPU 132 may obtain image data that has CMYK components and is formed in bitmap format (which will be referred to as "CMYK image data" hereinafter). The CMYK image data includes C values, M values, Y values and K values. After having executed the process of S20, the same processes as those in S25 to S95 are executed by using the C value in place of the pixel value X. Next, the same processes as those in S25 to S95 are repeatedly executed by using the M value, Y value and K value sequentially. Also according to this modification, it is possible to suppress formation of such an area in which a small dot is formed at each of all the pixel positions. Consequently, image quality of a printed image can be improved.

(Sixth Modification)

In place of the terminal device 100, a CPU (not illustrated) of the printer 200 may execute the respective processes in the processing shown in each of FIGS. 2, 5, 10 and 11. That is, a "controller" may be the CPU of the printer 200.

(Seventh Modification)

In the above-described embodiments, the CPU 132 of the terminal device 100 executes the program 138 (i.e., software) to attain the respective processes in the processing shown in each of FIGS. 2, 5, 10 and 11. Instead, at least one process in the processing shown in each of FIGS. 2, 5, 10 and 11 may be realized by hardware such as a logic circuit.

In the above-described embodiments, the printer 200 is of an ink jet type. However, the printer 200 may be of other types, including an electrophotographic type, in which a photosensitive body is scanned by a laser beam to form an electrostatic latent image, the electrostatic latent image is then developed by toner into a toner image, and the toner image is transferred onto a print medium.

A single technical element or various combinations of technical elements described in the present disclosure and the drawings exhibit technical utility, and are not limited to the combinations recited in the claims as filed. Moreover, the technique exemplified in the present disclosure and the drawings simultaneously achieves a plurality of objects, and exhibits the technical utility by achieving one of these objects.

What is claimed is:

1. A control apparatus for causing a print executing section to perform printing, the printing executing section being configured to form, on a print medium, M number of types of dots, M being an integer greater than or equal to two (2), the M number of types of dots including dot of a first type having a minimum size and dot of a second type having a size greater than the dot of the first type, the control apparatus comprising a controller configured to perform:

acquiring target image data containing a plurality of pixels;

generating print data containing a plurality of print pixels, the print pixels corresponding to the pixels, respectively, the generating the print data determining, for each pixel, a pixel value for the corresponding print pixel; and supplying the print data to the print executing section, the generating the print data including:

correcting a pixel value of a target pixel among the plural pixels by using two or more pixel-value error amounts corresponding to two or more neighboring pixels existing at positions neighboring to the target pixel, thereby calculating a corrected pixel value of the target pixel;

by using the pixel value of the target pixel, judging whether or not the target pixel is a prohibited pixel, formation of a dot of at least the first type among the M number of types of dots being prohibited on the print medium at a position corresponding to the prohibited pixel;

determining the pixel value of the print pixel corresponding to the target pixel by using the corrected pixel value of the target pixel and dependently on whether the target pixel is the prohibited pixel; and calculating the pixel-value error amount corresponding to the target pixel by using the pixel value of the print pixel corresponding to the target pixel, and the determining the pixel value of the print pixel corresponding to the target pixel including:

in a case where the corrected pixel value of the target pixel is within a first range and the target pixel is not the prohibited pixel, determining, as the pixel value of the print pixel corresponding to the target pixel, a first value indicating formation of a dot of the first type;

in a case where the corrected pixel value of the target pixel is within a second range that is different from the first range and the target pixel is not the prohibited pixel, determining, as the pixel value of the print pixel corresponding to the target pixel, a second value indicating formation of a dot of the second type;

in a case where the corrected pixel value of the target pixel is within a specific range that is different from both of the first and second ranges, determining, as the pixel value of the print pixel corresponding to the target pixel, a non-formation value indicating formation of no dots;

in a case where the corrected pixel value of the target pixel is within the first range and the target pixel is the prohibited pixel, determining the non-formation value as the pixel value of the print pixel corresponding to the target pixel;

wherein formation of a dot of the first type and a dot of the second type among the M number of types of dots is prohibited on the print medium at a position corresponding to the prohibited pixel, wherein in a case where the pixel value of the target pixel is within the first range, it is determined with a first probability that the target pixel is the prohibited pixel, and in a case where the pixel value of the target pixel is within the second range, it is determined with a second probability that the target pixel is the prohibited pixel, the second probability being less than the first probability.

2. The control apparatus according to claim 1, wherein in a case where the corrected pixel value of the target pixel is within the second range and the target pixel is the prohibited pixel, the non-formation value is determined as the pixel value of the print pixel corresponding to the target pixel.

3. The control apparatus according to claim 2, wherein in the case where the pixel value of the target pixel is within the second range, the second probability decreases as a difference between the pixel value of the target pixel and a first threshold value increases, the first threshold value being a border between the first range and the second range.

4. The control apparatus according to claim 2, wherein it is determined that the target pixel is not the prohibited pixel in a case where the pixel value of the target pixel indicates a highest density that can be represented by the target pixel.

5. The control apparatus according to claim 1, wherein formation of dots in all the M number of types is prohibited on the print medium at a position corresponding to the prohibited pixel, and wherein the determining the pixel value of the print pixel corresponding to the target pixel further includes:

in a case where the corrected pixel value of the target pixel is within the second range and the target pixel is the prohibited pixel, determining the non-formation value as the pixel value of the print pixel corresponding to the target pixel; and in a case where the corrected pixel value of the target pixel is within a range other than the first range, the second range, and the specific range and the target pixel is the prohibited pixel, determining the non-formation value as the pixel value of the print pixel corresponding to the target pixel.

6. The control apparatus according to claim 1, wherein a first threshold value is defined as a border between the first range and the second range, and wherein the judging whether or not the target pixel is a prohibited pixel includes:

determining a second threshold value dependently on a relationship between the pixel value of the target pixel and the first threshold value such that the second probability for the target pixel is less than the first probability for the target pixel;

allocating two or more different numerical values respectively to two or more pixels that are located adjacent to one another among the plurality of pixels; and judging whether or not the target pixel is the prohibited pixel by comparing the second threshold value with the numerical value allocated to the target pixel.

7. The control apparatus according to claim 1, wherein a first threshold value is defined as a border between the first range and the second range, and wherein the judging whether or not the target pixel is a prohibited pixel includes:

allocating a plurality of numerical values to the plurality of pixels, respectively, the numerical value allocated to the target pixel being determined dependently on a relationship between the pixel value of the target pixel and the first threshold value such that the second probability for the target pixel is less than the first probability of the target pixel;

by using allocation-value error amounts corresponding to two or more neighboring pixels located at positions neighboring to the target pixel, modifying the numerical value allocated to the target pixel, thereby obtaining a modified allocation value for the target pixel;

comparing the modified allocation value for the target pixel with a third threshold value, thereby judging whether or not the target pixel is the prohibited pixel;

in a case where it is determined that the target pixel is the prohibited pixel, determining, as the allocation-value error amount corresponding to the target pixel, a difference between the modified allocation value for the target pixel and a prescribed value; and in a case where it is determined that the target pixel is not the prohibited pixel, determining the modified allocation value for the target pixel as the allocation-value error amount corresponding to the target pixel.

8. A non-transitory computer readable storage medium storing a set of program instructions for a control apparatus, the control apparatus being configured to cause a print executing section to perform printing, the printing executing section being configured to form, on a print medium, M number of types of dots, M being an integer greater than or equal to two (2), the M number of types of dots including dot of a first type having a minimum size and dot of a second type having a size greater than the dot of the first type, the program instructions, when executed by a computer provided in the control apparatus, causing the computer to perform:

acquiring target image data containing a plurality of pixels;

generating print data containing a plurality of print pixels, the print pixels corresponding to the pixels, respectively, the generating the print data determining, for each pixel, a pixel value for the corresponding print pixel; and supplying the print data to the print executing section, the generating the print data including:

correcting a pixel value of a target pixel among the plural pixels by using two or more pixel-value error amounts corresponding to two or more neighboring pixels existing at positions neighboring to the target pixel, thereby calculating a corrected pixel value of the target pixel;

by using the pixel value of the target pixel, judging whether or not the target pixel is a prohibited pixel, formation of a dot of at least the first type among the M number of types of dots being prohibited on the print medium at a position corresponding to the prohibited pixel;

determining the pixel value of the print pixel corresponding to the target pixel by using the corrected pixel value of the target pixel and dependently on whether the target pixel is the prohibited pixel; and calculating the pixel-value error amount corresponding to the target pixel by using the pixel value of the print pixel corresponding to the target pixel, and the determining the pixel value of the print pixel corresponding to the target pixel including:

in a case where the corrected pixel value of the target pixel is within a first range and the target pixel is not the prohibited pixel, determining, as the pixel value of the print pixel corresponding to the target pixel, a first value indicating formation of a dot of the first type;

in a case where the corrected pixel value of the target pixel is within a second range that is different from the first range and the target pixel is not the prohibited pixel, determining, as the pixel value of the print pixel corresponding to the target pixel, a second value indicating formation of a dot of the second type;

in a case where the corrected pixel value of the target pixel is within a specific range that is different from both of the first and second ranges, determining, as the pixel value of the print pixel corresponding to the target pixel, a non-formation value indicating formation of no dots;

in a case where the corrected pixel value of the target pixel is within the first range and the target pixel is the prohibited pixel, determining the non-formation value as the pixel value of the print pixel corresponding to the target pixel;

wherein formation of a dot of the first type and a dot of the second type among the M number of types of dots is prohibited on the print medium at a position corresponding to the prohibited pixel, wherein in a case where the pixel value of the target pixel is within the first range, it is determined with a first probability that the target pixel is the prohibited pixel, and in a case where the pixel value of the target pixel is within the second range, it is determined with a second probability that the target pixel is the prohibited pixel, the second probability being less than the first probability.

9. A control apparatus for causing a print executing section to perform printing, the printing executing section being configured to form, on a print medium, M number of types of dots, M being an integer greater than or equal to two (2), the M number of types of dots including dot of a first type having a minimum size and dot of a second type having a size greater than the dot of the first type, the control apparatus comprising a controller configured to perform:

acquiring target image data containing a plurality of pixels;

generating print data containing a plurality of print pixels, the print pixels corresponding to the pixels, respectively, the generating the print data determining, for each pixel, a pixel value for the corresponding print pixel; and supplying the print data to the print executing section, the generating the print data including:

correcting a pixel value of a target pixel among the plural pixels by using two or more pixel-value error amounts corresponding to two or more neighboring pixels existing at positions neighboring to the target pixel, thereby calculating a corrected pixel value of the target pixel;

by using the pixel value of the target pixel, judging whether or not the target pixel is a prohibited pixel, formation of a dot of at least the first type among the M number of types of dots being prohibited on the print medium at a position corresponding to the prohibited pixel;

determining the pixel value of the print pixel corresponding to the target pixel by using the corrected pixel value of the target pixel and dependently on whether the target pixel is the prohibited pixel; and calculating the pixel-value error amount corresponding to the target pixel by using the pixel value of the print pixel corresponding to the target pixel, and the determining the pixel value of the print pixel corresponding to the target pixel including:

in a case where the corrected pixel value of the target pixel is within a first range and the target pixel is not the prohibited pixel, determining, as the pixel value of the print pixel corresponding to the target pixel, a first value indicating formation of a dot of the first type;

in a case where the corrected pixel value of the target pixel is within a second range that is different from the first range and the target pixel is not the prohibited pixel, determining, as the pixel value of the print pixel corresponding to the target pixel, a second value indicating formation of a dot of the second type;

in a case where the corrected pixel value of the target pixel is within a specific range that is different from both of the first and second ranges, determining, as the pixel value of the print pixel corresponding to the target pixel, a non-formation value indicating formation of no dots;

in a case where the corrected pixel value of the target pixel is within the first range and the target pixel is the prohibited pixel, determining the non-formation value as the pixel value of the print pixel corresponding to the target pixel, and wherein formation of a dot of the first type having the minimum size among the M number of types of dots is prohibited on the print medium at a position corresponding to the prohibited pixel, and formation of a dot of the second type having the size greater than the dot of the first type is not prohibited on the print medium at the position corresponding to the prohibited pixel.

10. The control apparatus according to claim 9, wherein the determining the pixel value of the print pixel corresponding to the target pixel further includes:

in a case where the corrected pixel value of the target pixel is within the second range and the target pixel is the prohibited pixel, the second value is determined as the pixel value of the print pixel corresponding to the target pixel; and in a case where the corrected pixel value of the target pixel is within a range other than the first range, the second range, and the specific range and the target pixel is the prohibited pixel, determining, as the pixel value of the print pixel corresponding to the target pixel, a value different from the first value, the second value, and the non-formation value and indicating formation of a dot of a type other than the first type and the second type.

11. A non-transitory computer readable storage medium storing a set of program instructions for a control apparatus, the control apparatus being configured to cause a print executing section to perform printing, the printing executing section being configured to form, on a print medium, M number of types of dots, M being an integer greater than or equal to two (2), the M number of types of dots including dot of a first type having a minimum size and dot of a second type having a size greater than the dot of the first type, the program instructions, when executed by a computer provided in the control apparatus, causing the computer to perform:

acquiring target image data containing a plurality of pixels;

generating print data containing a plurality of print pixels, the print pixels corresponding to the pixels, respectively, the generating the print data determining, for each pixel, a pixel value for the corresponding print pixel; and supplying the print data to the print executing section, the generating the print data including:

correcting a pixel value of a target pixel among the plural pixels by using two or more pixel-value error amounts corresponding to two or more neighboring pixels existing at positions neighboring to the target pixel, thereby calculating a corrected pixel value of the target pixel;

by using the pixel value of the target pixel, judging whether or not the target pixel is a prohibited pixel, formation of a dot of at least the first type among the M number of types of dots being prohibited on the print medium at a position corresponding to the prohibited pixel;

determining the pixel value of the print pixel corresponding to the target pixel by using the corrected pixel value of the target pixel and dependently on whether the target pixel is the prohibited pixel; and calculating the pixel-value error amount corresponding to the target pixel by using the pixel value of the print pixel corresponding to the target pixel, and the determining the pixel value of the print pixel corresponding to the target pixel including:

in a case where the corrected pixel value of the target pixel is within a first range and the target pixel is not the prohibited pixel, determining, as the pixel value of the print pixel corresponding to the target pixel, a first value indicating formation of a dot of the first type;

in a case where the corrected pixel value of the target pixel is within a second range that is different from the first range and the target pixel is not the prohibited pixel, determining, as the pixel value of the print pixel corresponding to the target pixel, a second value indicating formation of a dot of the second type;

in a case where the corrected pixel value of the target pixel is within a specific range that is different from both of the first and second ranges, determining, as the pixel value of the print pixel corresponding to the target pixel, a non-formation value indicating formation of no dots;
in a case where the corrected pixel value of the target pixel is within the first range and the target pixel is the prohibited pixel, determining the non-formation value as the pixel value of the print pixel corresponding to the target pixel, and
wherein formation of a dot of the first type having the minimum size among the M number of types of dots is prohibited on the print medium at a position corresponding to the prohibited pixel, and formation of a dot of the second type having the size greater than the dot of the first type is not prohibited on the print medium at the position corresponding to the prohibited pixel.

* * * * *